(12) United States Patent
Weise et al.

(10) Patent No.: US 7,044,692 B2
(45) Date of Patent: May 16, 2006

(54) SCREW THREAD CUTTING APPARATUS AND METHOD

(75) Inventors: Gary K. Weise, Placentia, CA (US); Richard J. Kesl, Placentia, CA (US)

(73) Assignee: Thermocraft Industries, Inc., Placentia, CA (US)

( * ) Notice: Subject to any disclaimer, the term of this patent is extended or adjusted under 35 U.S.C. 154(b) by 138 days.

(21) Appl. No.: 10/877,854

(22) Filed: Jun. 25, 2004

(65) Prior Publication Data

US 2005/0286984 A1 Dec. 29, 2005

(51) Int. Cl.
*B23G 5/20* (2006.01)
*B23G 5/18* (2006.01)
*B23C 5/00* (2006.01)

(52) U.S. Cl. .......................... 409/74; 409/73; 408/224; 470/199; 407/33

(58) Field of Classification Search .................. 409/74, 409/66, 71, 73, 65; 408/222–225; 470/199, 470/198; 407/33, 30
See application file for complete search history.

(56) References Cited

U.S. PATENT DOCUMENTS

| | | | | |
|---|---|---|---|---|
| 1,140,130 A | * | 5/1915 | Dies | 407/24 |
| 3,829,921 A | * | 8/1974 | Delaney | 470/198 |
| 4,125,057 A | * | 11/1978 | Cox | 409/74 |
| 4,409,868 A | * | 10/1983 | Huddle et al. | 408/222 |
| 4,913,604 A | * | 4/1990 | Zaengerle | 409/74 |
| 5,098,232 A | * | 3/1992 | Benson | 407/33 |
| 5,733,078 A | * | 3/1998 | Matsushita et al. | 409/74 |
| 5,873,684 A | * | 2/1999 | Flolo | 409/66 |
| 5,944,462 A | * | 8/1999 | Woodward | 409/74 |
| 6,012,882 A | * | 1/2000 | Turchan | 409/74 |
| 6,200,078 B1 | * | 3/2001 | Kubota | 409/74 |
| 6,565,297 B1 | * | 5/2003 | Schmitt | 409/66 |

FOREIGN PATENT DOCUMENTS

| | | | |
|---|---|---|---|
| DE | 4010075 A1 | * | 10/1991 |
| DE | 10252040 B3 | * | 1/2004 |
| JP | 3-196915 A | * | 8/1991 |

* cited by examiner

*Primary Examiner*—Erica Cadugan
(74) *Attorney, Agent, or Firm*—Terry L. Miller

(57) ABSTRACT

A thread cutting milling tool comprises a shank with a working portion formed with a recess for receiving a thread cutting insert. The thread cutting insert has one edge formed with a line of thread-form teeth of identical profile. The thread cutting teeth project laterally for cutting engagement with a work-piece while the tool spins about its axis. The tool also orbits within or about a work piece, and in one orbit of the tool in a helical cutting path relative to the work piece a number of complete turns of the screw-thread are formed which is equal to the number of teeth of the insert in engagement with the work-piece. A secondary cutter carried on the thread cutting milling tool provides for formation of a pilot portion or counter bore on the work piece at an end of the screw thread. The pilot portion or counter bore provides for alignment of a threaded member which is to engage the screw thread. Also, the secondary cutter provides for formation of a blunt or scalloped full-thread starting end for the screw thread at the pilot portion. The blunt starting end for the screw thread is robust, resists damage, and resists cross threading.

12 Claims, 4 Drawing Sheets

Fig.9

Fig.10 ately above may be seen in U.S. Pat. Nos. 4,913,604; and
SCREW THREAD CUTTING APPARATUS AND METHOD

BACKGROUND OF THE INVENTION

1. Field of the Invention

This invention concerns the cutting of screw-threads. More particularly, this invention relates to a screw thread cutting apparatus and method for cutting screw threads on a surface, which surface may be either an interior surface (i.e., female screw threads) or exterior (i.e., male screw threads), and which may be a straight cylindrical surface or a tapering surface. Still more particularly, the present invention relates to such a screw thread cutting apparatus and method in which the starting end of the first screw thread is spaced away from an adjacent end of the threaded surface to provide a pilot portion or counter bore portion. Further, the starting end of the first screw thread is blunt or scalloped, so as to provide a jam-resistant start for the screw thread, and to avoid cross threading as well.

2. Brief Description of Related Technology

The use of a screw thread cutting tool including a milling cutter with a shank defining a recess in which is received a replaceable multi-tooth thread cutting insert is well known and conventional. These thread cutting tools are employed in computer numerically controlled (CNC) milling machines to cut both internal and external threads, which threads may be of straight (i.e., cylindrical) shape, or may be tapered (i.e., conical shape). The cutting of such screw threads on or within a work piece conventionally creates a thread form that runs right up to the end of an externally threaded part, or right up to the open end of a bore defined within an internally threaded part.

Conventional technology of the type described immediately above may be seen in U.S. Pat. Nos. 4,913,604; and 5,098,232

With the conventional technology, after the performance of an interior or exterior thread cutting operation, if it is desired to provide a starting pilot portion on a work piece having a male screw thread, or a starting counter bore portion within a work piece having a female threaded bore, then in each case the provision of such starting portions requires the performance of a second operation. That is, a second cutting operation must be performed using a tool to form the counter bore or pilot portion on the work piece. Further, when such a starting portion is provided on a male or female threaded part, the starting end of the first thread adjacent to the starting portion is most usually reduced to a thin edge, or to a fine-dimension. That is, at its starting end, the thread form tapers from a full thread shape to essentially a fine edge or toward a zero thickness. Such a fine starting end of a first thread also has a low thread form height, so that it is easily cross threaded in the event that threaded parts are not perfectly aligned when it is attempted to screw them together. That is, such a fine-dimension or thin starting end for a screw thread is fragile and is highly subject to damage. Such damage may cause jamming of threaded parts when assembly of these parts is attempted. Further, a fine-dimension or thin starting end on the first thread tapers to a low height which is easily crossed over by a matching thread and promotes cross threading of screw threaded parts if an attempt is made to assemble them with imperfect alignment. Such cross threading when it occurs can ruin the screw threads, and can possibly make the screw threaded parts unusable as well.

SUMMARY OF THE INVENTION

An object for this invention is to reduce or eliminate one or more of the deficiencies of the conventional technology.

Further, an object for this invention is to provide a thread cutting milling tool and method which provides a starting pilot at the start of a male or female thread cut with the tool.

A further object for this invention is to provide a thread cutting milling tool and method as described above, and in which the starting pilot leads to a starting or first thread having a blunt or scalloped end, such that the starting pilot assists in aligning threaded parts to be assembled, and the blunt starting or first thread is both robust and resistant to damage, and also resists cross threading.

The present invention provides according to one aspect, a thread cutting tool with a recess in which is received a multi-tooth thread cutting insert formed with a line of teeth which are identical to each other and which have a profile complementary to that of the finished tooth of the screw-thread to be cut. In use of this thread-cutting tool, the tool is mounted on the spindle of a CNC milling machine for rotation about the axis of the spindle and the spindle is simultaneously moved in a path centered on the axis of the surface of the work-piece which is to be screw-threaded. The work-piece is mounted on a stationary work table. The thread cutting tool includes a secondary cutter spaced from and having a selected axial and rotational orientation relative to the thread cutting insert. The secondary cutter is so oriented relative to the thread cutting insert that a starting pilot is cut by the secondary cutter when it engages the work piece. Further, the secondary cutter scallops or blunts the end of the starting or first thread of the finished screw thread which is adjacent to the starting pilot.

If the inventive thread cutting milling tool is to cut a straight screw thread, then the line of thread cutting teeth of the insert is disposed parallel to the axis of the work-piece on or in which the thread is to be cut, so that where the surface is cylindrical the line of teeth extends parallel to the axis of the shank of the tool. On the other hand, where the surface to be screw threaded is conically inclined (i.e., to make a tapering thread) the line of thread cutting teeth of the thread cutting milling tool is similarly inclined to the axis of the shank of the tool.

Where the threaded surface is cylindrical, the radius of the cutting tool path as it orbits or gyrates in engagement with the work piece is constant; but where the threaded surface is conically inclined the radius of the cutting tool path (i.e., its orbital and helical path of engagement with the work piece) is varied continuously to follow the desired profile of the tapered thread surface.

In one aspect the invention provides a thread-cutting tool comprising an elongate shank having a lengthwise axis; a recess or pocket formed in the shank for receiving a multi-tooth thread cutting insert, and a starting thread removal cutter projecting laterally of the thread cutting tool such that this starting thread removal cutting substantially removes the first thread adjacent to an end of the work piece.

Removal of the first thread adjacent to an end of the work piece (i.e., adjacent to an end of the thread on an externally threaded part, or adjacent to the opening of a threaded bore within an internally threaded part) to provide a starting portion (i.e., a pilot or counter bore portion) makes alignment and threading engagement of threaded parts with one another very much easier. The removal of the first thread on a externally threaded part provides a cylindrical pilot feature which is first inserted into a threaded bore of an internally threaded part, and guides the externally threaded part toward threading engagement. Similarly, the removal of the first thread of a female threaded part provides a counter bore starting pilot portion, which may receive and assist in aligning a male threaded part.

Still further, a blunted or scalloped end of the first or starting thread on a threaded part makes jamming of threaded parts upon assembly much more unlikely. Conversely, such a blunted or scalloped starting or first thread on a threaded part or work piece provides a much more robust, damage resistant, and cross threading resistant part.

Additional objects and advantages of the present invention will be apparent in view of the following description of preferred exemplary embodiments of the invention, taken in conjunction with the following drawing Figures, in which like reference numerals indicate like features throughout the several views.

DETAILED DESCRIPTION OF PREFERRED EXEMPLARY EMBODIMENTS

Figure 1:
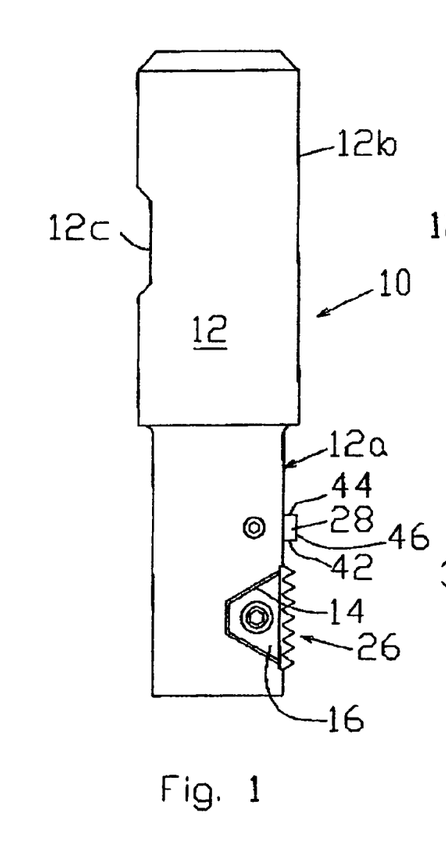
FIG. 1 is a side elevation view of a thread cutting milling tool embodying the present invention.
Figure 2:
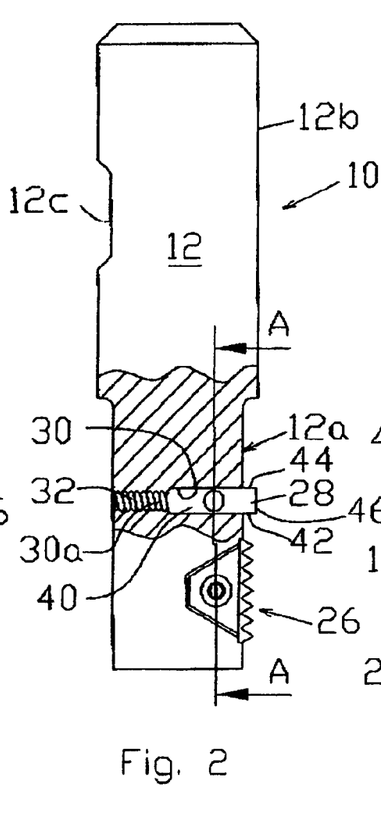
FIG. 2 is a side elevation view similar to FIG. 1, and having a portion of the structure of the thread cutting milling tool broken away for clarity of illustration.
Figure 3:
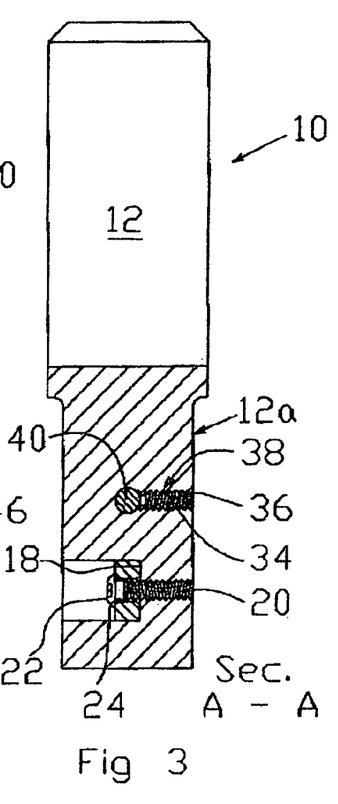
FIG. 3 is a side elevation view similar to FIGS. 1 and 2, with the view being taken along line 3—3 of FIG. 2, so that the viewer is looking perpendicularly to the direction of view seen in FIG. 2.

Referring to FIGS. 1, 2, and 3 in conjunction, a thread cutting tool or thread cutting milling tool 10 embodying this present invention includes an elongate shank 12 defining a recess or pocket 14, in which is received a multi-tooth thread cutting insert 16. The elongate shank 12 includes a working portion 12a on which the pocket 14 is formed, and an engagement portion 12b which is chucked by the CNC milling machine. A flat 12c provided on the engagement portion 12b provides for positive driving of the tool 10 by the CNC milling machine.

In this particular embodiment of the tool 10, the pocket 14 and thread cutting insert 16 are each trapezoidal in plan view, as is seen in FIGS. 1 and 2. However, the present invention is not limited to use of a thread cutting insert of any particular form or shape. As is seen in FIG. 3, the pocket 14 has a flat bottom surface 18, and a threaded bore 20 opens to this flat bottom surface 18. A thread cutting insert 16 is received into the recess 14, and is shaped in plan view (as is seen in FIGS. 1 and 2) to seat closely and securely in this pocket 14. A socket head cap screw 22 of button head configuration is received through a hole 24 defined by the thread cutting insert 16 and threadably engages into the bore 20. Thus, the insert 16 is securely held in the pocket 14 by cap screw 22. The insert 16 defines plural radially outwardly extending thread cutting teeth 26.

As those ordinarily skilled in the pertinent arts will appreciate, if the tool 10 is intended to cut straight threads (as is tool 10 illustrated in the FIGS. 1–5) then the teeth 26 will be arrayed parallel to the axis of the shank 12. On the other hand, in the event that the thread cutting milling tool 10 is intended to cut tapered threads (i.e., tapered pipe threads, for example) then the pocket 14 is disposed relatively angulated relative to the axis of the shank 12, so that the cutting insert 16 is similarly arranged to present thread cutting teeth 26 arrayed along a line that is angulated relative to the axis of shank 12, according to the taper desired to be provided on the tapered threads cut with the tool 10.

Those ordinarily skilled in the pertinent arts will also appreciate that the features of the thread cutting milling tool 10 described to this point are conventional, and are within the scope of the conventional technology. Also, those ordinarily skilled will appreciate that the thread cutting milling tool 10 may be employed to cut male or female threads. Because the principles and operation of the thread cutting milling tool 10 are easily transposed from cutting male screw threads to cutting female screw threads, the disclosure below addresses only the cutting of male screw threads. In the case of use of the thread cutting milling tool to cut female screw threads, then the relative positions of the minor and major diameters of the screw thread so cut are reversed relative to the center axis of the screw thread. Further to the above, it is seen in FIGS. 1–3 that the thread cutting milling tool 10 also carries a secondary radially projecting cutter 28 spaced a selected distance (i.e., in axial distance, or possibly both in axial and rotational orientation about the axis of shank 12) from the thread cutting insert 16. The secondary cutter 28 is disposed in a transverse bore 30 provided in the shank 12. A portion of the transverse bore 30 provides a screw thread 30a and a set screw 32 received into the threaded bore portion 30a engages the secondary cutter 28 to allow adjustment of the extent of outward radial projection or protrusion of this secondary cutter 28. The secondary cutter 28 is secured in a selected position of radially outward protrusion by a lock screw 34, in the form of a set screw threadably received into an intersecting bore 36 defining a screw thread 38. That is, an end of the lock screw 34 bears against a shank portion 40 of the secondary cutter 28.

As is seen in FIGS. 1 and 2, the secondary cutter 28 preferably includes a pair of opposite radially extending side cutting edges 42, 44. Also, the secondary cutter 28 defines an axially extending cutting edge 46 extending between radially outer terminations of the side cutting edges 42, 44. As a result, the radially outwardly protruding portion of the secondary cutter 28 as seen in FIGS. 1 and 2 has a square or rectangular shape. As FIG. 3 shows, the shank portion 40 of the secondary cutter 28 may be round in transverse sectional view, although the invention is not so limited.

Figure 4:
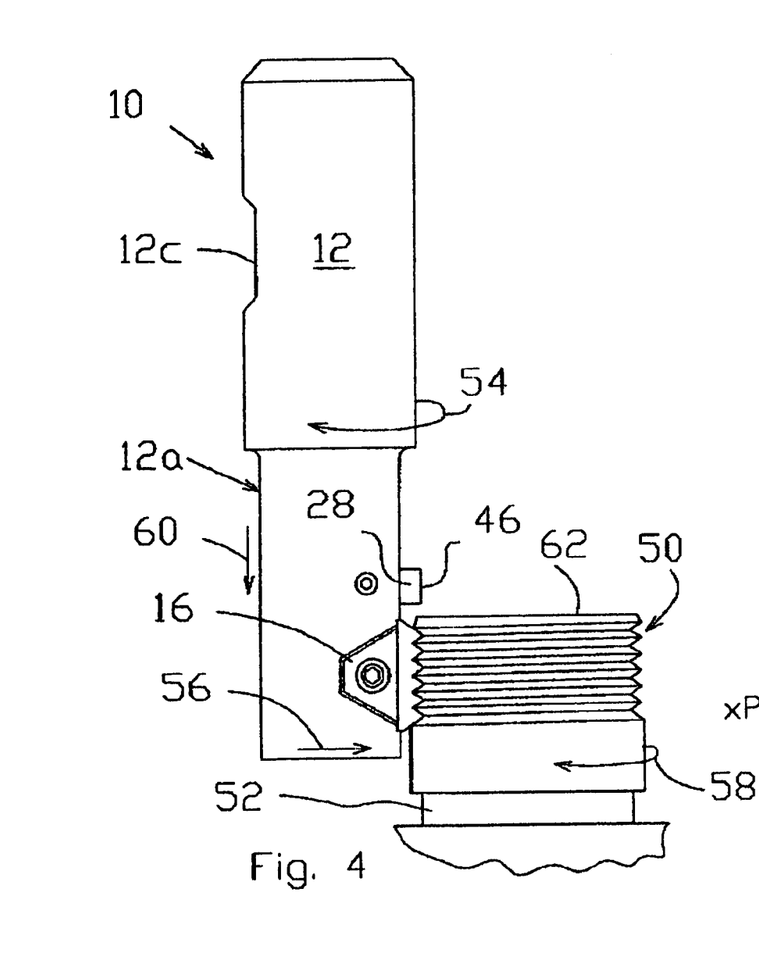
FIGS. 4 and 5 are sequential views of the thread cutting milling tool seen in FIGS. 1–3 being employed to form an external thread on a work piece and to providing a thread starting pilot feature on the free end of the work piece.
Figure 5:
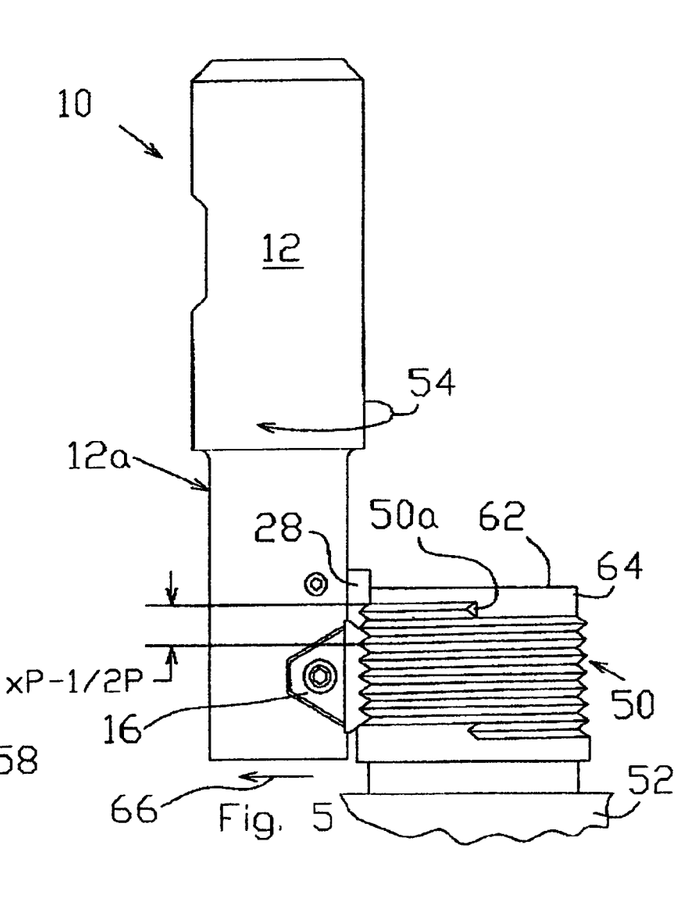

FIGS. 4 and 5 illustrate sequential steps in the method of utilizing a CNC milling machine (not seen in the drawing Figures) and a thread cutting milling tool 10 as described by reference to FIGS. 1–3, to form an external (i.e., male) screw thread 50 on the outside of a stationary cylindrical work piece 52. In this respect, FIGS. 4 and 5 are merely descriptive, and the tool 10 could as well be used to cut a female screw thread within a bore of a work piece. Those ordinarily skilled in the pertinent arts will understand that concepts and teachings of cutting male or female screw threads with a CNC milling machine and by use of a tool 10 embodying this invention are equivalents of one another.

In preparation to this screw thread cutting operation (which is shown in progress in FIG. 4), and while the tool 10 is still spaced radially from engagement with the work piece 52, the tool 10 is spun up or rotated at high speed about its axis by the CNC milling machine, as is indicated on FIG. 4 by arrow 54. The tool 10 is then advanced radially into engagement with the work piece 52, as is indicated by arrow 56, so that the thread cutting insert 16 engages the work piece 52. Simultaneously, the CNC milling machine gyrates or orbits the tool 10 about the work piece 52, while maintaining the desired degree of engagement of the thread cutting insert 16 with the work piece 52, as is indicated by arrow 58.

The result is that the tool 10 spins on its axis, gyrates or orbits about the work piece 52 with the thread cutting insert 16 engaging the work piece, and advances axially according to the pitch of screw thread 50 with each gyration. So, the cutting of the screw thread 50 advances from the free end 62 of the work piece along the length of this work piece (as is seen in FIG. 4) according to the length of the screw thread 50 desired. In the event that the tool 10 is used to cut a tapered screw thread, in addition to the angulation of the pocket 14 and thread cutting insert 16, the tool 10 will be moved slightly outward radially as it progresses about (i.e., gyrationally or orbitally) and axially along the work piece 52. This slight radial movement is coordinated with the taper angle of the screw thread so that the required increase in screw thread diameter from starting end 62 to the finish of the screw thread 50 is achieved.

As FIG. 5 illustrates, when the desired length of screw thread 50 is nearly finished being cut on work piece 52, the secondary cutter 28 also engages the work piece 52. This results from the axial relative motion of the cutter 10 along the work piece 52, as is indicated by arrow 60. As the secondary cutter 28 engages the work piece 52, it removes substantially the first thread form of screw thread 50 (i.e., the first wrap of thread from end edge 62 axially and helically about the work piece 52 through substantially one thread pitch dimension. That is, the secondary cutter 28 removes the screw thread form axially and through substantially 360 degrees of helical motion about the work piece 52. As is seen in FIG. 5, the result is a cylindrical pilot portion 64 on work piece 52. The axially extending end cutting edge 46 of the secondary cutter 28 is disposed relative to the thread cutting insert 16 so that the pilot portion 64 has a diameter just slightly less than the minor diameter of the screw thread 50 formed by the thread cutting insert 16.

Further, it is desired that the starting end (or end of the first thread) of screw thread 50 immediately adjacent to pilot portion 64 not start with a fine-edged partial thread, but that this screw thread start with substantially a full thread form.

Because the tool 10 carries the secondary cutter 28 in a radially outwardly disposed orientation, and at the completion of a thread cutting operation this tool is disengaged from the work piece 52 by the CNC milling machine effecting a quick radially outward relative motion (indicated by arrow 66) at the completion of the cutting of screw thread 50, the starting end 50a of screw thread 50 immediately adjacent to pilot portion 64 will inherently have a scalloped or concave blunt end surface which is of substantially full screw thread form. This is the case because the spinning of cutter 10 is very fast in relation to the quick outward radial motion indicated by arrow 66, so that the cutting surface 46 of cutter 28 effects a radius of cut on the end of the screw thread 50 which is about equal to the effective cutting diameter of the edge 46 of cutter 28 as it spins on tool 10.

Further, in order to achieve this desired blunt or scalloped full-thread form start 50a of the screw thread 50 adjacent to pilot portion 64, the axial spacing and rotational orientation of the secondary cutter 28 on shank 12 relative to the position of the thread cutting insert 16 is such that an axial spacing of an integer number of thread pitches minus about one-half (½) a thread pitch is disposed axially between the peak of a thread form 50 on work piece 52 formed by the cutting teeth on cutter 16, and the edge 42 of cutter 28. That is, any one of the peaks of the thread form 50 on work piece 52 formed by the cutting teeth of the cutter 16 is an integer number of thread pitches minus about one-half a thread pitch dimension axially from the cutting edge 42 of the secondary cutter 28. This axial relationship is illustrated in FIG. 4 by the indicated axial spacing arrow and the equation: "xP−½P", in which "x" is an arbitrary integer, and "P" is the screw thread axial pitch dimension.

Stated differently, the result of the axial and rotational relationship of the thread cutting insert 16 and secondary cutter 28 is that the cutting edge 42 of the cutter 28 is about centered on the valley between adjacent screw threads 50, or on the minor diameter of the thread form of screw thread 50, and as the tool 10 advances axially while the cutting of screw thread 50 is completed, this cutting edge 42 and axial edge 46 progressively remove the first wrap of thread form starting from the end edge 62, forming pilot portion 64, and progressing helically to the blunt thread end 50a. So, as this cutting edge 42 of the secondary cutter 28 removes the first wrap of thread form adjacent to the pilot portion 64, a scalloped or rather blunt substantially full thread form is maintained at the start 50a of the screw thread 50 adjacent to starting pilot portion 64.

As described immediately above, such will be the axial relationship of the thread cutting insert 16 and the secondary cutter 28 if they lie along substantially the same longitudinal line of shank 12 (as is seen in FIGS. 1 and 2, and as is best illustrated in FIG. 3). By careful consideration of FIG. 3 it can be appreciated that the cutters 16 and 28 are substantially aligned with one another along the length and on the same side of the shank 12. In the event that the positions of secondary cutter 28 and thread cutting insert 16 are relatively rotated along the shank 12, then the desired axial spacing between these two cutters in order to form a blunt-start screw thread 50a at the beginning of screw thread 50 will be adjusted in view of the rotational orientation of these two cutters. That is, a 180 degree orientation of these cutters relative to one another would require an axial relative spacing of an integer number of thread pitches between the any one of the peaks of the thread form 50 and the cutting edge 42 of the cutter 28. The important feature is that the cutting edge 42 of the secondary cutter be disposed about centered on the valley of the thread form cut by the thread cutting insert 16. In this way, the cutting edge 46 will remove the thread form and also scallop the starting end 50*a* of the screw thread 50 adjacent to pilot portion 64.

Other possible axial and rotational relative orientations between the thread cutting insert 16 and secondary cutter 28 on shank 12 are, of course, possible. However, the required relationship of the cutters 16 and 28 in order to achieve a blunt, or full-thread start 50*a* for the screw thread 50 at pilot portion 64 is clear in view of the above, and is within the skill of those ordinarily skilled in the art who have now received the advantages of this disclosure.

Figures 6, 7:
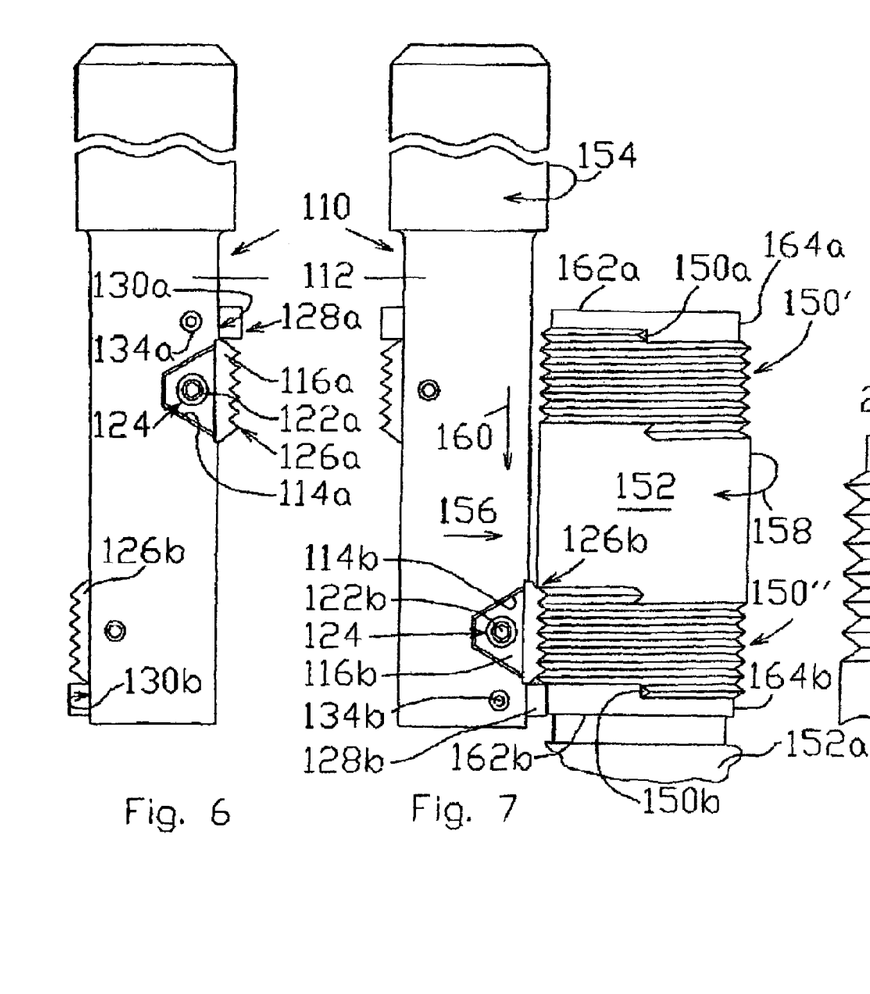
FIGS. 6 and 7 are respective side elevation views of a thread cutting milling tool according to an alternative embodiment of the present invention, and show opposite sides of the thread cutting milling tool, and FIG. 7 also shows a step in the method of employing the thread cutting milling tool seen in these Figures to simultaneously form two screw thread portions of the same hand on opposite ends of an elongate work piece, and to also simultaneously form a thread starting pilot feature on each of the thread portions.

FIGS. 6 and 7 provide side elevation views of the opposite sides of an alternative embodiment of a thread cutting milling tool according to this invention. Because the alternative embodiment of FIGS. 6 and 7 has many features in common with the first embodiment described in connection with FIGS. 1–5, features of the alternative embodiment that are the same as or analogous in structure or function to those described and depicted earlier are referenced with the same numeral used above, and increased by one-hundred (100).

Viewing now FIGS. 6 and 7 in conjunction with one another, it is seen that a thread cutting tool or thread cutting milling tool 110 embodying this present invention includes an elongate shank 112 defining a pair of spaced apart recesses or pockets 114*a* and 114*b*. Received into each one of the pair of pockets 114*a* and 114 is a respective one of a pair of multi-tooth thread cutting inserts 116*a* and 116*b*.

A respective one of a pair of socket head cap screws 122*a* and 122*b* each of button head configuration is received through a hole 124 defined by the thread cutting inserts 116*a* and 116*b*. These cap screws 122*a* and 122*b* and threadably engage into respective threaded bores (not seen in FIGS. 6 and 7 in order to secure the thread cutting inserts 116*a* and 116*b* in the recesses 114*a* and 114*b*.

Each of the inserts 116*a* and 116*b* defines plural radially outwardly extending thread cutting teeth 126*a* and 126*b*. As was explained above, the pockets 114*a* and 114*b* may be arranged to present the thread cutting inserts 116*a* and 116*b* to cut either straight or tapered threads.

The thread cutting milling tool 110 also carries a pair of secondary radially projecting cutters 128*a* and 128*b* each spaced along the shank 112 (i.e., spaced axially and possibly rotationally as well) a selected distance from the adjacent thread cutting insert 116*a* and 116*b*. Each one of the pair of secondary cutters 128*a* and 128*b* are disposed in a respective pair of transverse bores (indicated by arrowed numerals 130*a* and 130*b*) provided in the shank 112, and are there adjustable for depth in the same way described above with respect to the first embodiment, as well as being secured by a respective set screw or lock screw 134*a* or 134*b*.

FIG. 7 also illustrates a step in the method of utilizing a CNC milling machine (not seen in the drawing Figures) and a thread cutting milling tool 110 as described by reference to FIGS. 6 and 7 to simultaneously form a pair of spaced apart external (i.e., male) screw thread portions 150' and 150" on the outside of a stationary cylindrical work piece 152. In this case, the work piece 152 is tubular and is carried on a collet (not seen in FIG. 8) extending upwardly above a base member 152*a*.

As is seen in FIG. 7, the screw threads 150' and 150" are formed while the tool 110 is rotated by a CNC milling machine (not seen in the drawing Figures) at high speed about the axis of shank 112 (as is indicated on FIG. 7 by arrow 154), and is advanced radially into engagement with the work piece 152 (indicated by arrow 156) and is simultaneously gyrated or orbited about the work piece 152 (i.e., while maintaining the desired degree of engagement of the thread cutting inserts 116 with the work piece 152), and is simultaneously advanced axially according to the pitch of screw threads 150' and 150" (which have the same pitch and same handedness) with each gyration (indicated by arrows 158 and 160).

So, at one end of the work piece 152, the cutting of the screw thread 150' or 150" advances from the respective free end 162*a* or 162*b* of the work piece along the length of this work piece, while at the other end of the work piece, the thread cutting starts at a point intermediate of the ends of the work piece and spaced from the adjacent free end (162*a* or 162*b*), and progresses toward the respective free end. In other words, viewing FIG. 7, the relative axial motion of the thread cutting tool 110 along work piece 152 during thread cutting may be relatively upwardly or downwardly. In each case, screw threads 150' and 150" of the same hand (i.e., left handed or right handed screw threads) are simultaneously formed on the opposite end portions of the work piece 152.

Also, each screw thread portion 150' and 150" is provided with a pilot portion 164*a* and 164*b* by action of the secondary cutters 128*a* and 128*b*. Still further, the starting thread at each pilot portion 164*a* and 164*b* will have a blunt or scalloped full-thread form surface 150*a*, 150*b*. The formation of such a blunt starting thread end 150*a*, 150*b* at one end of the work piece is easy to understand in view of the description of the first embodiment above. That one end is the one having the same sense of tool movement described above with respect to the first embodiment, in which the relative tool movement is from the free end of the work piece toward a screw thread completion spaced from this free end. In the same sense as described above for the first embodiment, the secondary cutter (128*a* or 128*b*) of the tool 110 will form the pilot portion (164*a* or 164*b*) and will scallop the starting end of the first screw thread.

However, formation of a blunt starting thread form end 150*a* or 150*b* at the opposite end of the work piece is accomplished by the secondary cutter 128*a* or 128*b* first making a cut into the work piece, and proceeding helically toward the adjacent free end of the work piece to form the pilot portion. Then the thread cutting insert working at that end of the work piece advances also toward the adjacent free end (cutting screw threads as it progresses) and encounters the starting cut made by the secondary cutter. Because of the axial and rotational relationship of the thread cutting inserts and secondary cutters as described above, in this case the screw thread is cut with an alignment such that the starting cut made by the secondary cutter becomes the end of the thread form when the screw thread is cut at that location by the cutter 116. Again, the secondary cutter 128*a* or 128*b* provides a blunt or scalloped full-thread starting end for the thread form cut by the adjacent cutter 116*a* or 116*b*.

Stated differently, at one end of the work piece 152, the screw thread adjacent to the end edge 162*a* or 162*b* is cut first, followed by formation of the pilot portion 164 and scalloping of the starting screw thread end. At the other end of the work piece 152, the pilot portion 162*a* or 162*b* is cut first (while the thread cutting insert is working at some distance from the starting pilot portion), and the thread leading to this pilot portion is formed next, ending at a surface 150*a* or 150*b* of the pilot portion which was cut earlier by the secondary cutter 128*a* or 128*b*. Because the thread cutting inserts and secondary cutters have the desired axial and rotational relationship, the scalloped starting end of the thread form can be cut before or after the cutting of the screw thread.

Still further, it is possible with the thread cutting milling tool 110 of FIGS. 6 and 7 to simultaneously cut tapered threads of the same hand on opposite ends of a work piece, but with the screw threads so cut having opposite directions of taper. And, the work piece is also provided with a respective pilot portion at which the tapered thread portion starts with a blunt full-thread. This unique combination of functions is possible using a thread cutting milling tool according to the present invention, by selecting the lengths of the thread cutting inserts 116a and 116b to be substantially equal in length to the length of each screw thread portion 150' and 150" minus a single thread pitch dimension. Particularly, the thread cutting inserts can be one thread pitch less in length than the number of tapered screw threads desired to be cut onto a work piece. Thus, the screw thread cutting milling tool 110 will make a single helical orbit about the work piece 152, with no radial motion to account for screw thread taper. The taper of the screw threads so cut is achieved simply by the angulation of the thread cutting inserts 116a and 116b on the tool 110. Further, the secondary cutters 128a and 128b are rotationally positioned on the shank 112 such as to provide room for both the thread cutting inserts 116a and 116b and the adjacent secondary cutters 128a and 128b at each end of the working portion of shank 112.

Figure 8:
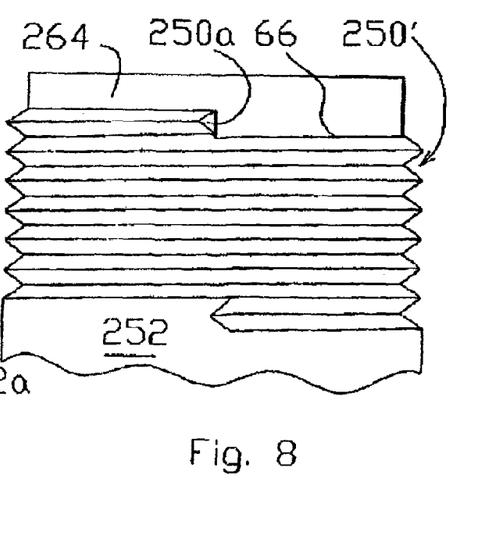
FIG. 8 is an enlarged fragmentary view of a screw threaded portion of a work piece having screw threads formed in accord with the first or second embodiment of this invention.
Figure 8A:
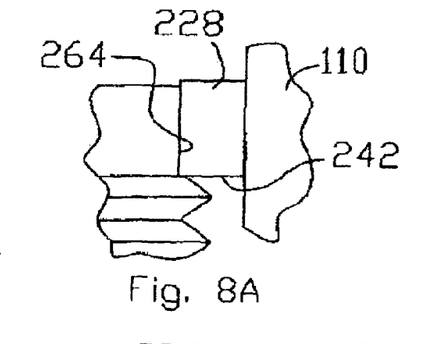
FIG. 8A is a still more greatly enlarged fragmentary portion of the screw threaded portion of the work piece seen in FIG. 9 and is taken adjacent to a starting pilot feature of this work piece.

Turning now to FIGS. 8 and 8A an additional embodiment of the invention is there illustrated. Again, because this embodiment has many features in common with the first two embodiments, features which are the same or which are analogous in structure or function to those depicted and described above are indicated with the same reference numeral used above, and increased by two-hundred (200). Viewing FIGS. 8 and 8A, it is seen that a work piece 252 has screw threads 250 cut thereon by the method of this invention and using a tool as described above. However, it will be noted also that the first full wrap of the screw thread 250 has both a blunt starting surface 250a, as well as a slight undercut (indicated by arrowed numeral 66) which extends axially by between about 0.002 inch to about 0.010 inch, and preferably about 0.005 inch from the center of the thread form at its minor diameter and into the next adjacent full thread. This undercut 66 is achieved by having the secondary cutter 228 positioned about 0.005 inch closer to the thread cutting insert 216 than would be indicated by the relationship set out above. That is, instead of the secondary cutter 228 being positioned with the cutting edge 242 at an integer number of thread pitches minus one-half thread pitch, as described above; the secondary cutter 228 is so positioned with an additional 0.005 inch of spacing subtracted from the integer number of thread pitches (minus one-half thread pitch) which space the thread cutting insert (not seen in the drawing FIGS.) from secondary cutter 228. Thus, the secondary cutter 228 fully removes the thread form radius which is formed at the minor diameter of the screw thread 250 by the thread cutting insert. That is, a close consideration of standard thread forms will reveal that the minor diameter is defined not by a sharp angular intersection of adjacent thread surfaces, but by a blending radius. This blending radius is removed by the embodiment of FIGS. 8 and 8A in the pilot portion 264 and up to the blunt starting end 250a. As a result, ease of assembly of the work piece 250 with another screw threaded part is better assured.

Figure 9:
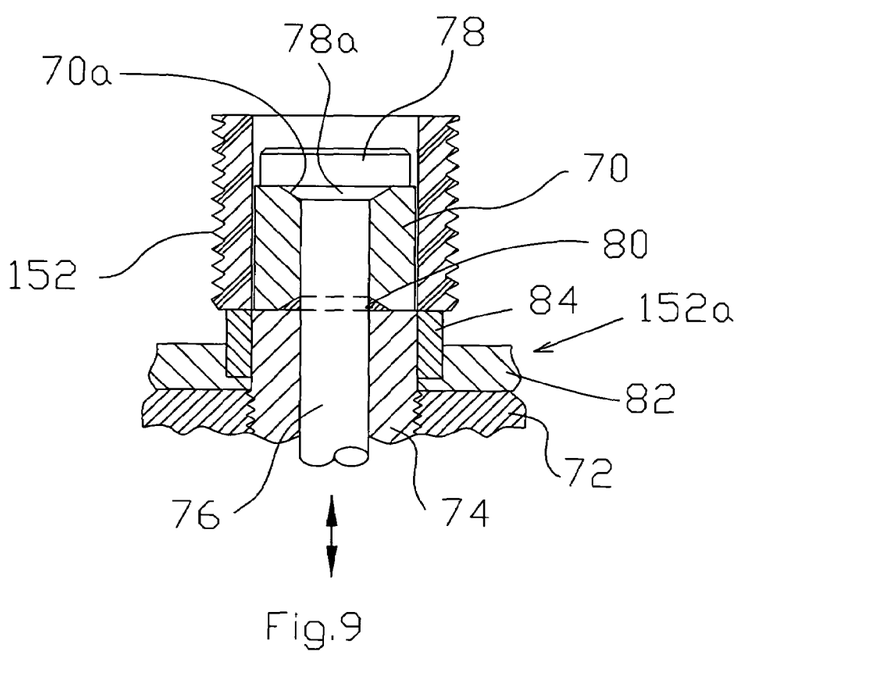
FIGS. 9 and 10 are respective illustrations of sequential steps in the method of using a thread cutting milling tool according to the present invention in order to form a thread portion adjacent to the upper end of a tubular work piece.
Figure 10:
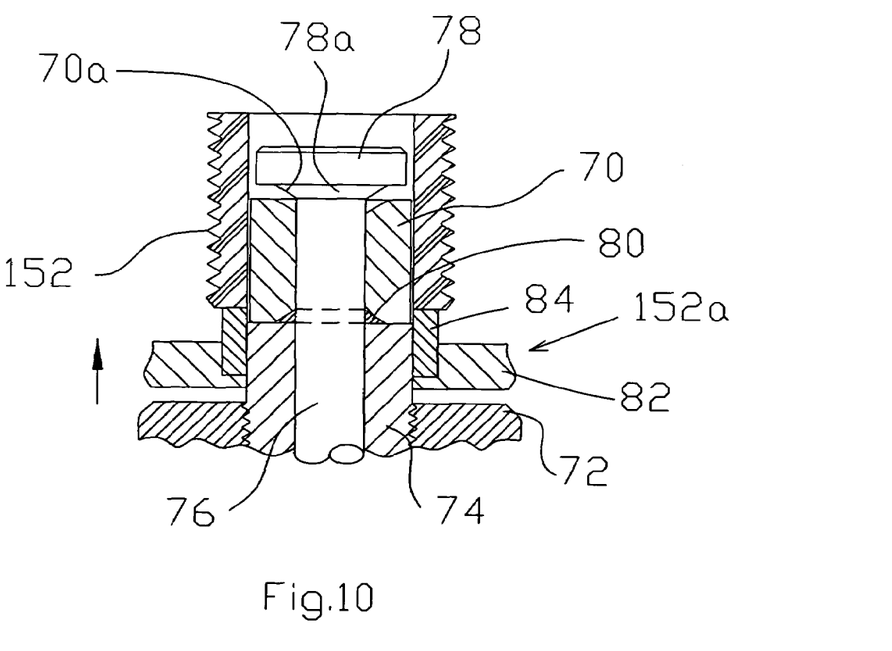

Turning now to FIGS. 9 and 10 in conjunction with one another, a fixture 152a (as was alluded to above) and including an expansible collet structure 70 is carried by a base plate 72 having a cylindrical bushing member 74 extending upwardly on the base plate. The bushing 74 guides a draw bolt 76 which is forcefully reciprocable relative to the base plate, as is indicated by the associated double headed arrow on FIG. 9. The draw bolt 76 includes a head portion 78 having a forcing cone section 78a on its underside, and bearing against matching conical surfaces 70a of the collet 70. At the lower end of the collet 70, opposed conical surfaces 70a are engaged by a forcing washer 80, which surrounds the pull bolt 76 and rests atop of the bushing 74. A stripper plate 82 is carried above the base plate 72, and carries a tubular stripper boss 84 surrounding the bushing 74. The stripper plate 82 and stripper boss 84 are reciprocable vertically relative to the base plate 72, as is indicated by the associated double headed arrow of FIG. 9. In the relative positions of the stripper plate 82 and base plate 72 illustrated in FIG. 9, the top surfaces of the bushing 74 and of the tubular stripper boss are coextensive. Also as is seen in FIG. 9, the top surface of the bushing 74 provides a surface supporting the collet 70, while the top surface of the stripper boss 84 provides a surface for supporting a work piece 152.

As is indicated in FIG. 9, when the stripper plate 82 is in engagement with the base plate 72 and a work piece 152 is engaged over the collet 70, a forceful downward movement of the draw bolt 76 expands the collet 70 and locks the work piece 152 in place. As thus locked in place, the work piece 152 may be screw threaded on its radially outer surfaces, as was explained above with respect to the use of the thread cutting tool 10. In FIG. 9, this screw thread cutting operation is illustrated as already having taken place on the work piece 152.

Now, on the other hand, at the completion of a screw thread cutting operation, as is indicated in FIG. 10, an upward relative motion of the draw bolt 76 allows the collet 70 to contract radially a small amount, which is enough to release the locking hold of the collet 70 on the work piece 152. Subsequently, the stripper plate 82 is forcefully moved slightly upwardly relative to the base plate 72, so that the work piece 152 is raised a fraction of the length of the collet member 70, in preparation for the work piece 152 being removed from the fixture 152a.

While the invention has been described with reference to the foregoing preferred exemplary embodiments, many changes and modifications may be made thereto which fall within the scope of the appended claims.

We claim:

1. A thread cutting milling tool comprising an elongate rotary shank defining a longitudinal axis and carrying a radially projecting thread cutting insert for rotationally engaging a work piece along a helical orbital path in order to cut screw threads thereon, the screw threads including a thread form helically wrapping about an axis of said work piece, said shank further carrying a secondary radially extending cutter spaced from said thread cutting insert for also rotationally engaging the work piece along a helical orbital path, and wherein the spacing and configuration of said secondary cutter is such that said secondary cutter engages the workpiece along the helical orbital path in a position corresponding to said thread form so as to substantially remove at least a partial wrap of said thread form from said work piece to thereby provide a non-threaded cylindrical portion on said work piece.

2. The thread cutting milling tool of claim 1 wherein said substantial removal of at least a partial wrap of said thread form from said work piece is positioned at an end of the screw threads cut by said thread cutting insert, and provides an axially and helically extending non-threaded portion on the work piece.

3. A thread cutting milling tool according to claim 1 in which said thread cutting insert and said secondary cutter are spaced apart on said elongate rotary shank so as to have an effective linear spacing along the axis of said shank which is equal to an integer number of thread pitch dimensions minus one-half a thread pitch dimension.

4. A thread cutting milling tool according to claim 1 in which said thread cutting insert and said secondary cutter are spaced apart on said elongate rotary shank so as to have an effective linear spacing along the axis of said shank which is equal to an integer number of thread pitch dimensions minus one-half a thread pitch dimension and also minus a selected additional dimension.

5. A thread cutting milling tool according to claim 4 in which said selected additional dimension is in the range from about 0.002 inch to about 0.010 inch.

6. A thread cutting milling tool according to claim 1 in which said thread cutting insert includes a plurality of axially arrayed thread cutting teeth complementary to said thread form.

7. A thread cutting milling tool according to claim 6 wherein said plurality of thread cutting teeth are arrayed in an axially extending line parallel to the longitudinal axis of said shank, whereby said thread cutting milling tool is configured to cut straight screw threads on the work piece.

8. A thread cutting milling tool according to claim 6 wherein said plurality of thread cutting teeth are arrayed in an axially extending line at a selected angle relative to the longitudinal axis of said shank, whereby said thread-milling tool is configured to cut tapered screw threads of said selected angle on the work piece.

9. A thread cutting milling tool according to claim 1 wherein said secondary cutter defines a radially outer axially extending cutting edge, and said secondary cutter is arranged on said shank in axially and rotationally spaced relationship to said thread cutting insert so that said radially outer cutting edge is radially and axially congruent with the location of the helical screw thread form on the work piece, whereby as said thread cutting insert rotationally engages said work piece along said helical orbital path and relatively moves helically to cut said screw threads thereon, said secondary cutter likewise engages said work piece and moves along a corresponding helical orbital path congruent with the path of said screw thread form on said work piece to there remove a portion of said work piece thus to provide said non-threaded cylindrical portion on said work piece.

10. A thread cutting milling tool according to claim 9 wherein said secondary cutter forms a scalloped starting thread end surface on said thread form adjacent to said non-threaded cylindrical portion, whereby a starting thread end on the work piece is a full thread form which is resistant to damage and cross threading.

11. A thread cutting milling tool according to claim 9 wherein said axially extending cutting edge of said secondary cutter is disposed relative to said shank so as to form said non-threaded cylindrical portion with a diameter corresponding to one of: the minor diameter of a male screw thread, or the major diameter of a female screw thread cut by said thread cutting insert.

12. A thread cutting milling tool according to claim 1 wherein said shank includes a pair of recesses, each recess receiving a respective radially projecting thread cutting insert for engagement with a work piece, and said shank further carries a pair of secondary cutters, each one of said pair of secondary cutters being associated in selected spaced relationship with one of said pair of thread cutting inserts so as to engage a work piece at locations along a respective helical orbital path corresponding to respective screw thread portions defined by a respective one of said pair of thread cutting inserts, said pair of secondary cutters engaging said work piece so as to helically remove portions of said work piece at respective helical thread form paths corresponding to the associated thread cutting insert, thereby to provide a pair of non-threaded portions each adjacent to a respective end of the work piece and to each of the pair of screw thread portions cut on said work piece by said pair of thread cutting inserts.

* * * * *